United States Patent
Perera et al.

(10) Patent No.: US 11,710,829 B2
(45) Date of Patent: Jul. 25, 2023

(54) METHOD AND SYSTEM FOR WATER BASED PHENOLIC BINDERS FOR SILICON-DOMINANT ANODES

(71) Applicant: Enevate Corporation, Irvine, CA (US)

(72) Inventors: Sanjaya D. Perera, Irvine, CA (US); Liwen Ji, Irvine, CA (US); Younes Ansari, Irvine, CA (US); Benjamin Park, Irvine, CA (US)

(73) Assignee: Enevate Corporation, Irvine, CA (US)

( * ) Notice: Subject to any disclaimer, the term of this patent is extended or adjusted under 35 U.S.C. 154(b) by 14 days.

(21) Appl. No.: 17/339,666

(22) Filed: Jun. 4, 2021

(65) Prior Publication Data

US 2022/0013782 A1 Jan. 13, 2022

Related U.S. Application Data

(62) Division of application No. 16/925,111, filed on Jul. 9, 2020, now Pat. No. 11,038,176.

(51) Int. Cl.
*H01M 4/62* (2006.01)
*H01M 4/134* (2010.01)
(Continued)

(52) U.S. Cl.
CPC ......... *H01M 4/621* (2013.01); *H01M 4/0404* (2013.01); *H01M 4/0471* (2013.01);
(Continued)

(58) Field of Classification Search
CPC .... H01M 4/04; H01M 4/0404; H01M 4/0471; H01M 4/386; H01M 4/621; H01M 4/622; H01M 4/625
See application file for complete search history.

(56) References Cited

U.S. PATENT DOCUMENTS 9,139,441 B2 9/2015 Anguchamy et al.
9,601,218 B2 3/2017 Jung et al.
(Continued)

FOREIGN PATENT DOCUMENTS

WO 2016123272 A1 8/2016

OTHER PUBLICATIONS

S. Mingru et al., "Silicon, flake graphite and phenolic resin-pyrolyzed carbon based Si/C composites as anode material for lithium-ion batteries", Adv. Powder Tech., 2013, 24(6), 921-925.
(Continued)

*Primary Examiner* — Amanda C. Walke
(74) *Attorney, Agent, or Firm* — McAndrews, Held & Malloy, Ltd.

(57) ABSTRACT

Systems and methods for water based phenolic binders for silicon-dominant anodes may include an electrode coating layer on a current collector, where the electrode coating layer is formed from silicon and a pyrolyzed water-based phenolic binder. The water-based phenolic binder may include phenolic/resol type polymers crosslinked with poly (methyl vinyl ether-alt-maleic anhydride), poly(methyl vinyl ether-alt-maleic acid), and/or Poly(acrylamide-co-diallyldimethylammonium chloride) (PDADAM). The electrode coating layer may further include conductive additives. The current collector may comprise one or more of a copper, tungsten, stainless steel, and nickel foil in electrical contact with the electrode coating layer. The electrode coating layer may include more than 70% silicon. The electrode may be in electrical and physical contact with an electrolyte, where the electrolyte includes a liquid, solid, or gel. The battery electrode may be in a lithium ion battery.

25 Claims, 12 Drawing Sheets

(51) Int. Cl.
*H01M 4/1395* (2010.01)
*H01M 4/66* (2006.01)
*H01M 4/04* (2006.01)
*H01M 10/0525* (2010.01)
*H01M 4/38* (2006.01)
*H01M 4/02* (2006.01)

(52) U.S. Cl.
CPC ......... *H01M 4/134* (2013.01); *H01M 4/1395* (2013.01); *H01M 4/386* (2013.01); *H01M 4/625* (2013.01); *H01M 4/661* (2013.01); *H01M 10/0525* (2013.01); *H01M 2004/027* (2013.01)

(56) References Cited

U.S. PATENT DOCUMENTS

| | | |
|---|---|---|
| 9,705,128 B2 | 7/2017 | Put et al. |
| 10,128,496 B2 | 11/2018 | Laicer et al. |
| 11,038,176 B1 | 6/2021 | Perera et al. |
| 2011/0200874 A1 | 8/2011 | Ono et al. |
| 2016/0006024 A1 | 1/2016 | Xiao et al. |
| 2016/0344030 A1 | 11/2016 | Sakshaug et al. |
| 2018/0097229 A1 | 4/2018 | Jo et al. |
| 2018/0287158 A1 | 10/2018 | Ma et al. |
| 2020/0280070 A1 | 9/2020 | Sakshaug et al. |

OTHER PUBLICATIONS

H. Cho et al., "Partially Carbonized Poly (Acrylic Acid) Grafted to Carboxymethyl Cellulose as an Advanced Binder for Si Anode in Li-ion Batteries". J. Electrochem. Sci. Technol., 2019, 10(2), 131-138.

International Search Report, PCT/US2021/0391244 dated Oct. 19, 2021, 14 pages.

International Preliminary Report on Patentability, PCT/US2021/039124 dated Jan. 19, 2023, 8 pages.

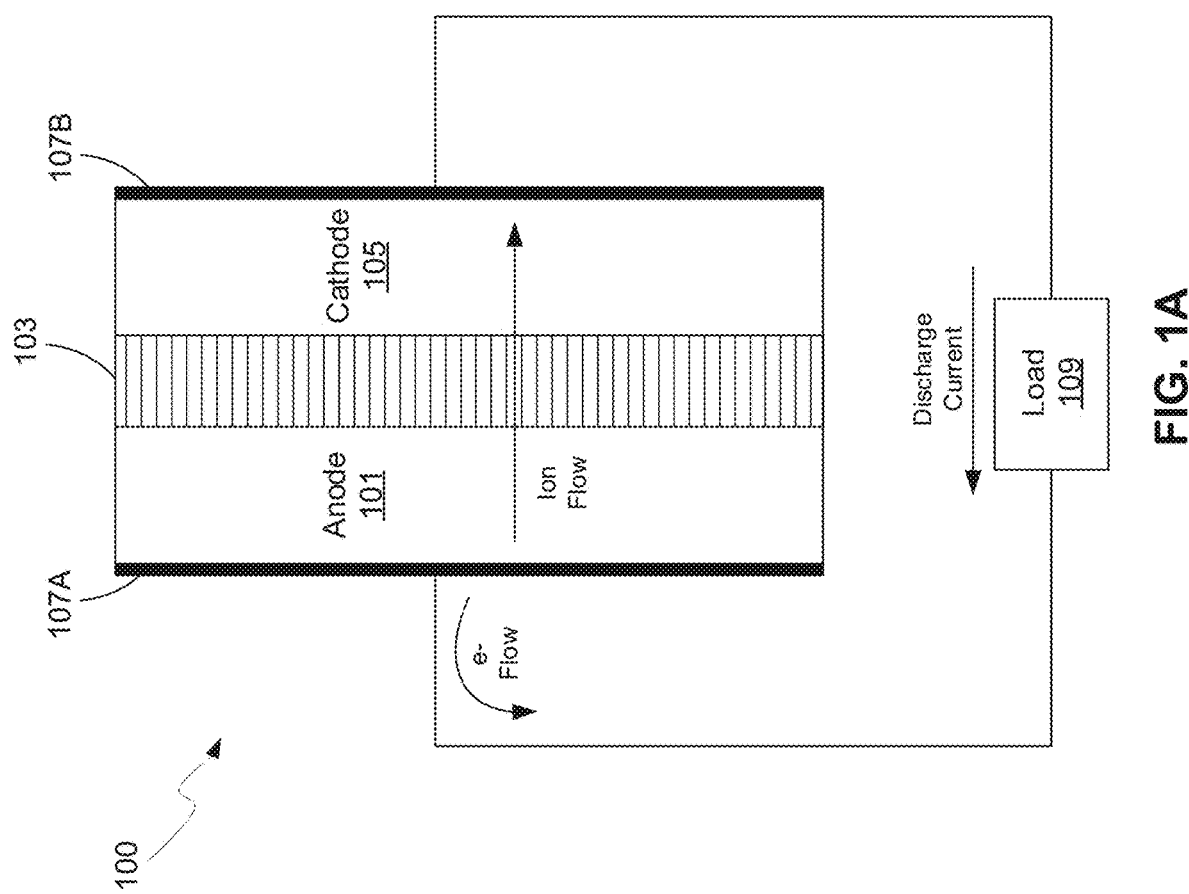

METHOD AND SYSTEM FOR WATER BASED PHENOLIC BINDERS FOR SILICON-DOMINANT ANODES

CROSS-REFERENCE TO RELATED APPLICATIONS

This application is a divisional of and claims the benefit of U.S. application Ser. No. 16/925,111 filed Jul. 9, 2020, pending (now allowed). The entirety of the above referenced application is hereby incorporated by reference.

FIELD

Aspects of the present disclosure relate to energy generation and storage. More specifically, certain embodiments of the disclosure relate to a method and system for water based phenolic binders for silicon-dominant anodes.

BACKGROUND

Conventional approaches for battery electrodes may be costly and cause electrode coating layers to lose contact with the electrode.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for using modified phenolic/resol type polymers which are water-soluble as binders for silicon anodes in Li-ion battery electrodes, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIGS. 1A and 1B are diagrams of a battery, in accordance with an example embodiment of the disclosure. FIG. 1A is a simplified example battery and FIG. 1B shows realistic battery structures.

FIG. 4A shows results for phenolic resin alone. FIG. 4B shows analysis of a phenolic resin-PMVMA polymer blend at 1:1 ratio.

FIG. 4C shows analysis of a phenolic resin-PMVMA polymer blend at 1:0.25 ratio.

DETAILED DESCRIPTION

Figure 1B:
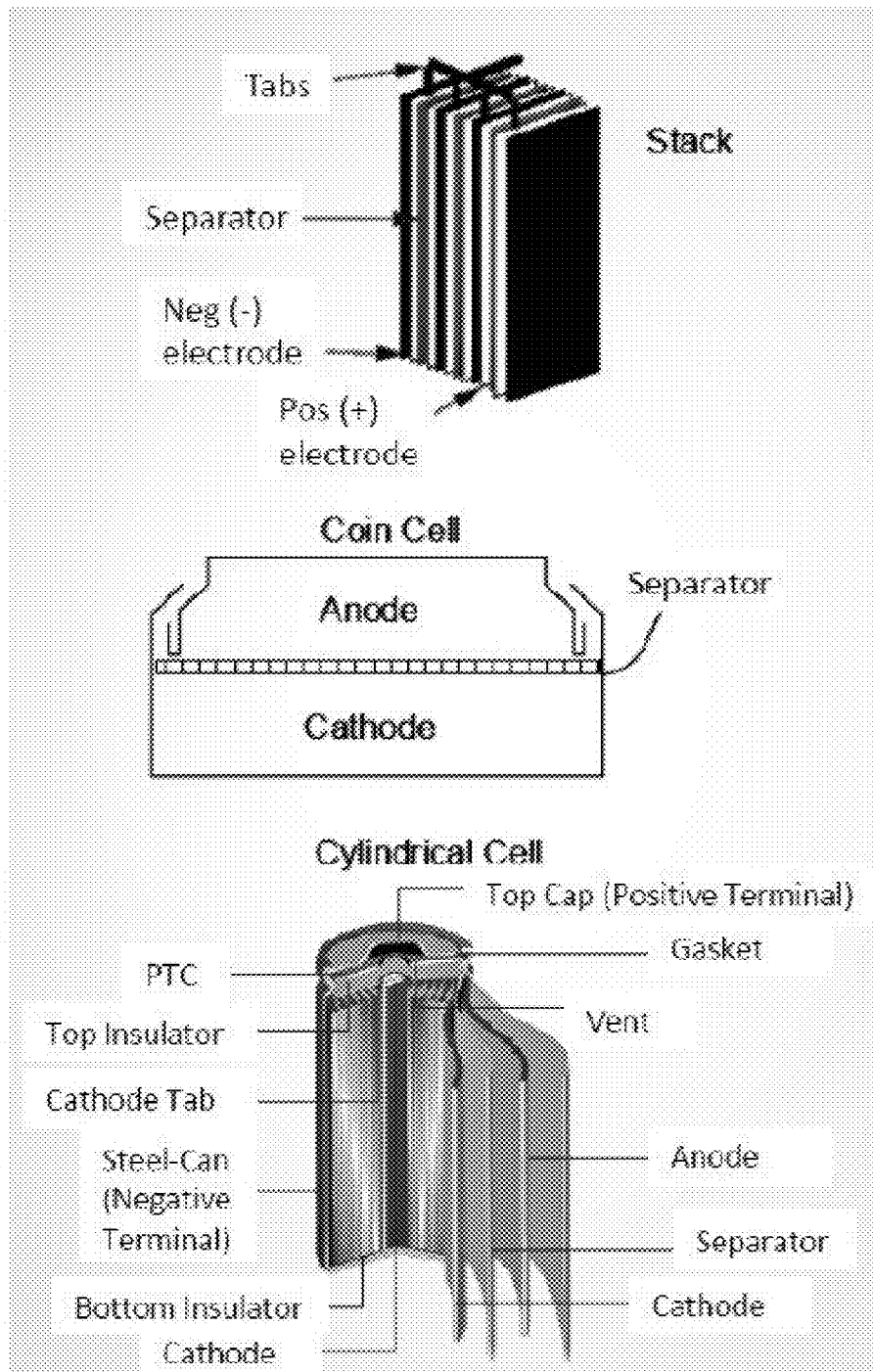

FIG. 1 is a diagram of a battery with silicon-dominant anodes, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack. Furthermore, the cell shown in FIG. 1 is a very simplified example merely to show the principle of operation of a lithium ion cell. Examples of realistic structures are shown to the right in FIG. 1, where stacks of electrodes and separators are utilized, with electrode coatings typically on both sides of the current collectors. The stacks may be formed into different shapes, such as a coin cell, cylindrical cell, or prismatic cell, for example.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the electrode coating layer in forming electrodes.

The configuration shown in FIG. 1 illustrates the battery 100 in discharge mode, whereas in a charging configuration, the load 109 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or electrode coating layer coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), F2EC, VC, Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, LiTFSI, LiFSI, LiDFOB, LiBOB, LiTDI, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the electrode coating layer used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the electrode coating layer for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. With demand for lithium-ion battery performance improvements such as higher energy density and fast-charging, silicon is being added as an electrode coating layer or even completely replacing graphite as a dominant anode material. Most electrodes that are considered "silicon anodes" in the industry are graphite anodes with silicon added in small quantities (typically <20%). These graphite-silicon mixture anodes must utilize the graphite, which has a lower lithiation voltage compared to silicon; the silicon has to be nearly fully lithiated in order to utilize the graphite. Therefore, these electrodes do not have the advantage of a silicon or silicon composite anode where the voltage of the electrode is substantially above 0V vs Li/Li+ and thus are less susceptible to lithium plating. Furthermore, these electrodes can have significantly higher excess capacity on the silicon versus the opposite electrode to further increase the robustness to high rates. Lithium-ion batteries with silicon-dominant anodes show much higher rate performance compared to graphite anodes, with ~10 C charge rates possible.

Silicon-based anodes have a lithiation/delithiation voltage plateau at about 0.3-0.4V vs. $Li/Li^+$, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

Although there has been a significant amount of effort to develop silicon anodes, the primary focus of developing these anodes is in dealing with the following three key issues: 1) silicon nanoparticles—the majority of the silicon-based anodes that have high silicon content use silicon nanoparticles to alleviate the large volume expansion. Nano-silicon is expensive and generally requires special processing methods to prepare in large scale, which are not cost effective for large scale battery manufacturing. 2) Carbon additives—silicon-based electrode manufacturers commonly use carbon additives and binders mixed in organic solvents. The use of organic based binders and solvents has challenges associated with the toxicity and high cost. 3) non-conducting binder material—the final anode formulation still contains non conducting polymeric binder that does not contribute to the electrochemical performance. As a result of this "dead weight" of the binder, the improvement of gravimetric energy density of the resulting cells may be limited.

Among the recent advancements in silicon-based anode development, one is the direct coated anode using organic solvent-based binders followed by heat treatment to convert the binder into a carbon matrix. The present disclosure addresses the following key advancements: 1) the use of environmentally friendly water-based anode processing and scalability; 2) the capability of developing anodes with high Si content>90 wt. % for high capacity; 3) the development of Si dominant anodes free of non-conducting binders capable of fast charging (>2 C), i.e. anodes that contain only carbon and silicon; and 4) the development of a cost effective process, with silicon microparticles and water being used in the anode production as opposed to solvents and silicon nanoparticles. Although solvent-based anodes have had some effectiveness in improving cycle performance, these anodes may have weak adhesion to the current collector and contain non-continued carbon media that leads to unacceptable performance. Although the introduction of carbon additives can somewhat improve the conductivity of the anode, the existence of carbon additives may weaken the adhesion of anode materials to the current collector. Thus, the binder plays an important role in improving the performance of silicon anodes.

Currently, polymeric binders are used in almost all silicon anode technologies to keep the integrity of the anode during excessive volume changes during lithiation. Although polyvinylidene difluoride (PVDF) is commonly used in graphite cells, it is not capable of handling the excessive volume changes of silicon. Additionally, PVDF is soluble only in toxic organic solvents such as NMP, which require solvent recovery systems to recycle the solvent. In an example scenario, polymeric binders that are capable of mitigating the capacity fade of Si anodes occurring at a high rate and long-term cycling are disclosed. Water-based anode fabrication is of interest for large scale manufacturing of anodes to reduce the cost and eliminate the use of toxic solvents. Objectives of a water-based anode polymer include: 1) ease of processing—the resin being highly soluble in water allowing for ease of adjusting viscosity during coating; 2) high carbon yield and film-forming properties upon pyrolysis to create a conductive matrix around and between silicon particles; 3) a homogeneous distribution of polymeric components in water and the slurry without phase separation during the slurry formulation or coating; and 4) possessing a relatively low pyrolysis temperature that is compatible with the thermal behavior of the associated current collector.

Commercially available water-soluble polymers such as Poly(acrylic acid) (PAA) or Carboxymethyl cellulose (CMC), have significantly low carbon yield (<10 wt. %) and develop microcracks during pyrolysis. As a result, these water-soluble polymers exhibit poor mechanical properties in the anode after pyrolysis. Polymer resins and their derivatives with high carbon yield upon pyrolysis are desired to yield a continuous carbon medium while keeping the robustness of the anode. Although available polymers and their blends may be capable of achieving a high char yield, most of these polymers are insoluble in water.

Polymers are created from monomers and the molecular weight (MW) of a polymer is based on the identity of the monomer and the number of monomers present in the polymer molecule. Polymer molecular weights are usually given as averages and may fall in a distribution. The MW distribution determines the properties of the polymer. In the measurement of the average MW, the two most common ways to measure are Mn, number averaged MW, and Mw, weight averaged MW (midpoint of the distribution in terms of the number of molecules). Polydispersity of a polymer (Mw:Mn ratio) describes the distribution width. Other ways to calculate MW include viscosity average molecular weight (Mv), and higher average molecular weight (Mz, Mz+1). The choice of method for polymer molecular weight determination depends on factors such as cost, experimental conditions and requirements. Degree of polymerization is also often used in discussing polymers; this is the average number of monomeric units per molecule.

Among other polymer derivatives, phenolic resins are particularly attractive since they have high molecular weight and high char yield, which are ideal properties for adoption as binders for silicon anodes. Phenolic resins (or phenol formaldehyde resins (PF)) include synthetic resins such as those obtained by the reaction of phenols with formaldehyde. Phenolic resins are divided into two main types, novolacs and resoles. Novolacs are phenol-formaldehyde resins made when the molar ratio of formaldehyde to phenol is around one or less than one. Resols are phenol-formaldehyde resins are made with a formaldehyde to phenol ratio of greater than one (usually between about 1.2-2, in some embodiments, around 1.2-1.7). Ortho, meta and para linkages are contemplated, as well as linear and branched structures. Phenolic resins can have different molecular weights and degrees of polymerization depending on the reaction condition.

Novolac phenolic resins (may also be referred to as a phenolic/novolac type polymer) have phenolic units mainly linked by methylene groups. An example structure of a novolac phenolic resin is shown below (I):

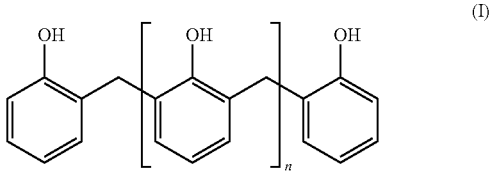

(I)

In some embodiments, n may be >5; in other embodiments, n may be >10, >50, >100, >500 or >1,000. Branched novolak types such as phenol-crotonaldehyde-resorcinol resins are also contemplated.

Resol phenolic resins (may also be referred to as a phenolic/resol type polymer) may have methylene and/or ether bridges and have unreacted hydroxymethyl (—CH$_2$OH) groups. In some embodiments, the number of units in the resin may be >5; in other embodiments, the number of units may be >10, >50, >100, >500 or >1,000. An example structure of a resol phenolic resin is shown below (II):

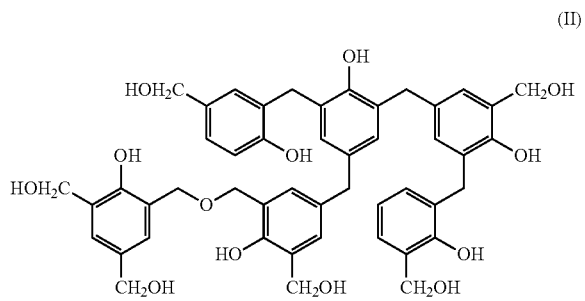 [SMILES: OCc1ccc(O)c(Cc2cc(Cc3cc(CO)c(O)c(COCc4cc(CO)cc(CO)c4O)c3)cc(Cc3cc(CO)c(O)c(Cc4cccc(CO)c4O)c3)c2O)c1]

(II)

However, most phenolic resins typically do not readily dissolve in water but are soluble in alcohol and ketones. Some resol resins may be slightly soluble, but the solubility is generally low. Some water-soluble phenols have very low water tolerance that leads to the formation of a separated polymer phase with the addition of water. This is an obstacle to water-based processing.

In the present disclosure, additives that overcome the low water solubility obstacle associated with phenolic resins by increasing their solubility are described. Thus, in accordance with the disclosure, phenolic resins such as (I) or (II) above are modified in various ways, which significantly increases their solubility in water. The additives may react with the phenolic resin to make a derivative. In some embodiments, derivatives of the resins are made having but not limited to —COOH, and/or —CO—NH$_2$ groups, etc. In other embodiments, other additives are combined with the phenolic resins to make blends. In some embodiments, the resol backbone can be used for further reactions to make various binder structures. Depending on the specific derivatization and/or blends that are created, water solubility (water tolerability) can be tailored to achieve desired binder properties required for Si anodes. In some embodiments, a phenolic/resol type polymer is used as the starting material.

In this disclosure, a binder-free Si dominant (>70 wt. %, >50 wt. %) electrode is fabricated using water-soluble derivatives or blends of phenolic polymer resins. The water soluble derivatives or blends of phenolic polymer resins are created from different water-soluble polymer crosslinkers or additives, and are used as the binder. These water-based slurries may possess high viscosity and result in high carbon yield upon heat treatment/pyrolysis while retaining the electrode structure. This is described further with respect to FIGS. 2-8.

Figure 2:
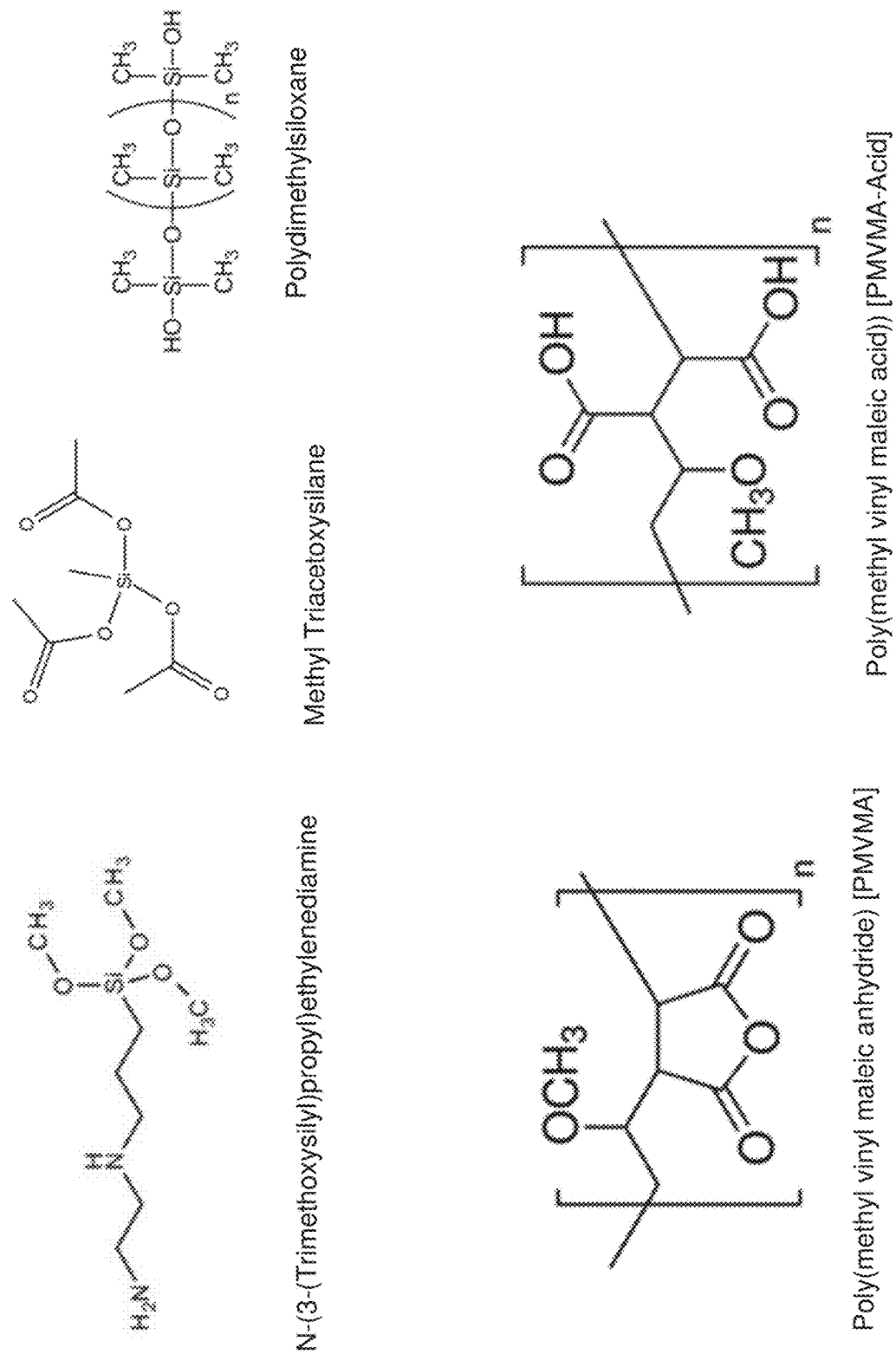
FIG. 2 illustrates exemplary materials for combining with phenolic resins to make water soluble derivatives, in accordance with an example embodiment of the disclosure.

The phenolic resins can be derivatized by reacting, and/or can be included in a polymer blend by addition of polymer additives. The phenolic resin derivatives have increased water solubility. FIG. 2 illustrates some exemplary materials for combining with phenolic resins to make derivatives or blends for use in making electrodes, in accordance with an example embodiment of the disclosure.

One reaction used to derivatize the phenolic resins is crosslinking. Crosslinking is the process of forming chemical bonds to join (or bridge) two or more polymer chains. Crosslinking can occur when polymers are reacted, either internally, or with other compounds that have functional groups (crosslinking group). Crosslinking can occur by bridging with methyl, ethyl, ether, carboxylate, ester, amide, or any other functional groups that can contribute to form a polymeric network.

One crosslinking group can be silanes and their combinations with different functional groups. The functional groups and silane groups can play a significant role of crosslinking within the phenolic resin polymer matrix and as well as adhesion to the current collector. Referring to FIG. 2, example silanes such as N-(3-(Trimethoxysilyl)propyl) ethylenediamine, methyl triacetoxysilane, and polydimethylsiloxane are shown. Other silanes having —OH, ester or amine groups are contemplated.

Phenolic type resins are also capable of crosslinking with water-soluble polymers containing hydrophilic functional groups to create a blend of the two polymers. The use of a water-soluble hydrophilic polymer can significantly improve the water tolerance and/or solubility of phenolic resin blend compared to unmodified phenolic resins.

Phenolic resin polymer blends can be made by the use of polymer additives, including, but not limited to maleic anhydride and maleic acid polymers. FIG. 2 shows water soluble polymer additives such as poly(methyl vinyl maleic anhydride) (PMVMA] and poly(methyl vinyl maleic acid)) (PMVMA-Acid). Polymer additives such as maleic anhydride polymers may form blends which may be prepared with phenolic resins using water as the solvent, for example, where poly(methyl vinyl maleic anhydride) (PMVMA) may be utilized in combination with phenolic resin. In another example scenario, polymer blends may be prepared using maleic acid based polymers as the additive with water as the solvent, for example where poly(methyl vinyl maleic acid) (PMVMA-Acid) may be utilized in combination with phenolic resin.

As described herein and in copending U.S. case entitled "Silicon Anodes with Water-Soluble Maleic Anhydride-, and/or Maleic Acid-Containing Polymers/Copolymers, Derivatives, and/or combinations (with or without additives) as Binders," (Inventors Ji, L.; Ansari, Y.; Perera, S.; and Park, B., the entirety of which is hereby incorporated by reference, hydrophilic anhydride and/or acid containing polymers such as water-soluble maleic anhydride- and/or maleic acid-containing polymers/co-polymers, derivatives, and/or combinations can be used in combination with the disclosed phenolic/resol type polymers (phenolic resins). Maleic anhydride- and/or maleic acid-containing polymers may be used to crosslink phenolic/resol type polymers to make them water soluble (or increase water solubility). As discussed herein, various water-soluble polymers can be used to derivatize phenolic/resol type polymers to make a modified water soluble polymer that can be used as a binder for Si anodes. Water-soluble maleic anhydride- and/or maleic acid-containing polymers/co-polymers, derivatives, and/or combinations may be blended, crosslinked and/or derivatized to improve their properties. This includes being crosslinked to or co-polymerized with another polymer, such as the phenolic resins disclosed herein. The inclusion of a water-soluble polymer containing hydrophilic functional groups can significantly improve the water tolerance of a phenolic resin blend compared to unmodified phenolic resins. The polymer derivatives containing hydrophilic functional groups used for crosslinking, blending or co-polymerization may include anhydride and/or acid containing polymers such as those disclosed in the copending U.S. case entitled "Silicon Anodes with Water-Soluble Maleic Anhydride-, and/or Maleic Acid-Containing Polymers/Copolymers, Derivatives, and/or combinations (with or without additives) as Binders."

Other polymers can be used to create polymer blends with the phenolic resins. For example, acrylamide polymers can be used, including, but not limited to poly(acrylamide-co-diallyldimethylammonium chloride) (PDADAM):

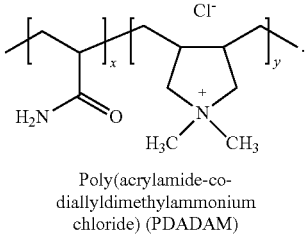

Poly(acrylamide-co-diallyldimethylammonium chloride) (PDADAM)

In some embodiments, x and/or y may be >10; in other embodiments, x and or y may be >100, >1,000, >10,000 or >100,000.

Additional polymers can be used to create polymer blends with the phenolic resins. For example, polyamide polymers can be used, including, but not limited to polyamide-imide (PAI):

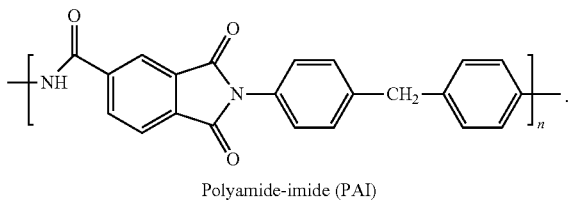

Polyamide-imide (PAI)

In some embodiments, n may be >10; in other embodiments, n may be >100, >1,000, >10,000 or >100,000.

Further derivatives of phenolic/resol type polymers include derivatization of the resol backbone by one or more functional groups to create a derivative. Derivatives include, but are not limited to ethers, polyethoxylates, esters, glycolipids, phosphates, oxiranes, and/or carbamates. In some embodiments, the modification is at one or more of the phenolic oxygens. Example partial structures of derivatives are shown below, where A depicts the connection to the rest of the polymer structure:

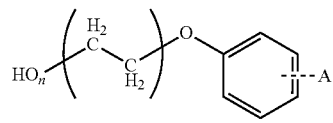

polyethoxylates

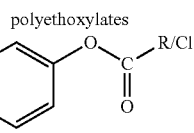

Esters (where R may be alkyl, fluoro-alkyl, alkylene, alkoxy, alkenyl, alkenylene, alkynyl, alkynylene, cycloalkyl, cycloalkylene, aryl, arylene, heteraryl, heteroalkyl, heteroalkylene, heterocycloalkyl, and heterocycloalkylene)

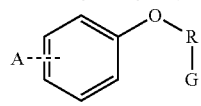

Glycolipid (R may be a carbohydrate moiety and G may be a lipid)

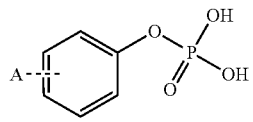 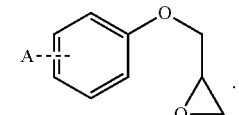

phosphates          oxiranes

The as-synthesized phenolic polymer derivatives and/or blends may be used to prepare slurries using silicon and the as-synthesized phenolic polymers as the binder, followed by doctor blade coating to prepare silicon-dominant anodes. The active material may be pyrolyzed under an argon atmosphere (or any inert atmosphere) to generate silicon-dominant anodes of 50% or greater silicon by weight. In accordance with the disclosure, "active material" may comprise the active material alone, or may encompass an entire electrode coating layer, which includes the active material and other components.

In an example scenario, phenolic polymer resin may be cross-linked with various water soluble polymers to create derivatives (blends) that have improved water solubility and optimized viscosity, including: (1) maleic anhydride-polymers; (2) maleic acid-containing polymers; and (3) poly (acrylamide-co-diallyldimethylammonium chloride). These phenolic resin derivatives can be made into a slurry and used to create an anode, which is subsequently pyrolyzed. The pyrolyzed anodes show improved adhesion to copper current collectors and desirable flexibility. The resulting anodes are capable of fast charging and show similar or better cycling performance compared to the current anode technology, which uses organic solvents and lamination to a current collector for anode manufacturing.

Figure 3A:
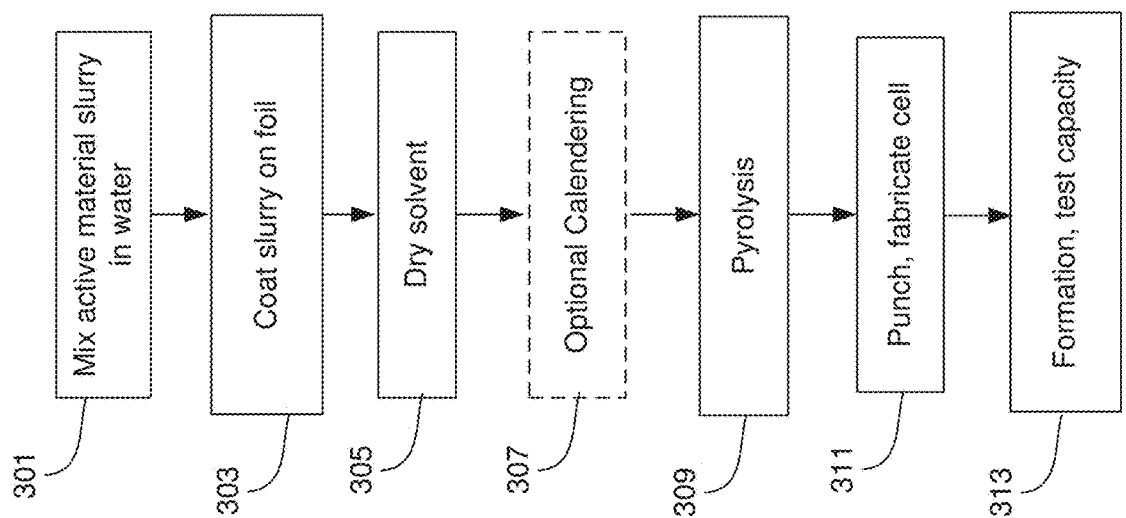
FIG. 3A is a flow diagram of a direct coating process for fabricating a cell with a silicon-dominant electrode, in accordance with an example embodiment of the disclosure.

FIG. 3A is a flow diagram of a direct coating process for fabricating a cell with a silicon-dominant electrode, in accordance with an example embodiment of the disclosure. This process comprises physically mixing the electrode coating layer and conductive additive together, and coating it directly on a current collector as opposed to forming the electrode coating layer on a substrate and then laminating it on a current collector. This strategy may also be adopted by other anode-based cells, such as graphite, conversion type anodes, such as transition metal oxides, transition metal phosphides, and other alloy type anodes, such as Sn, Sb, Al, P, etc.

In step 301, the raw electrode coating layer may be mixed in a slurry comprising phenolic/resol type polymer (phenolic resin) with poly(methyl vinyl ether-alt-maleic anhydride) (PMVMA) with the ratio of phenolic resin:PMVMA ranging but not limited to about 1:1, 1:0.5, and 1:0.25 by weight. The starting wt % of PMVMA may be about 10%, 20%, or <50% in deionized (DI) water. Phenolic resins and PMVMA form polymer blends readily with DI water without gelling/phase separation and creates a viscous solution that can be directly used for preparing the anode slurry.

In another example scenario, phenolic/resol type polymer (phenolic resin) may be mixed with poly(methyl vinyl ether-alt-maleic acid) (PMVMA-Acid) with the ratio of phenolic resin:PMVMA-Acid ranging but not limited to about 1:1, 1:0.5, and 1:0.25 by weight. The starting wt % of PMVMA-Acid may be about 10%, 20%, or <50% in deionized (DI) water.

In yet another example scenario, phenolic/resol type polymer (phenolic resin) may be mixed with poly(acrylamide-co-diallyldimethylammonium chloride) (PDADAM) with the ratio of phenolic resin:PDADAM ranging but not limited to about 1:1, 1:0.5, and 1:0.25 by weight. The starting wt % of PDADAM can be about 10%, 20%, or <50% in deionized (DI) water. In each of these scenarios, no solvents are need in mixing the slurry.

The particle size (nano to micro) and mixing times may be varied to configure the electrode coating layer density and/or roughness. Furthermore, cathode electrode coating layers may be mixed in step 301, where the electrode coating layer may comprise lithium cobalt oxide (LCO), lithium iron phosphate, lithium nickel cobalt manganese oxide (NMC), Ni-rich lithium nickel cobalt aluminum oxide (NCA), lithium manganese oxide (LMO), lithium nickel manganese spinel, LFP, Li-rich layer cathodes, LNMO or similar materials or combinations thereof, mixed with carbon precursor and additive as described above for the anode electrode coating layer.

In step 303, the as-prepared slurry may be coated on a copper foil, 20 μm thick in this example, and in step 305 may be dried at 130° C. in a convection oven to dry the coating and form the green anode. Similarly, cathode electrode coating layers may be coated on a foil material, such as aluminum, for example.

An optional calendering process may be utilized in step 307 where a series of hard pressure rollers may be used to finish the film/substrate into a smoother and denser sheet of material.

In step 309, the electrode coating layer may be pyrolyzed by heating to 500-800° C., 650° C. in this example, in an inert atmosphere such that carbon precursors are partially or completely converted into conductive carbon. The pyrolysis step may result in an anode electrode coating layer having silicon content greater than or equal to 50% by weight, where the anode has been subjected to heating at or above 400 degrees Celsius.

Pyrolysis can be done either in roll form or after punching in step 311. If done in roll form, the punching is done after the pyrolysis process. In instances where the current collector foil is not pre-punched/pre-perforated, the formed electrode may be perforated with a punching roller, for example. The punched electrodes may then be sandwiched with a separator and electrolyte to form a cell. In step 313, the cell may be subjected to a formation process, comprising initial charge and discharge steps to lithiate the anode, with some residual lithium remaining, and the cell capacity may be assessed. The fabricated anode shows superior adhesion to copper, a remarkable cohesion, and exceptional flexibility. This anode is shown to be capable of fast charging and performs similar or better than current anodes.

Figure 3B:
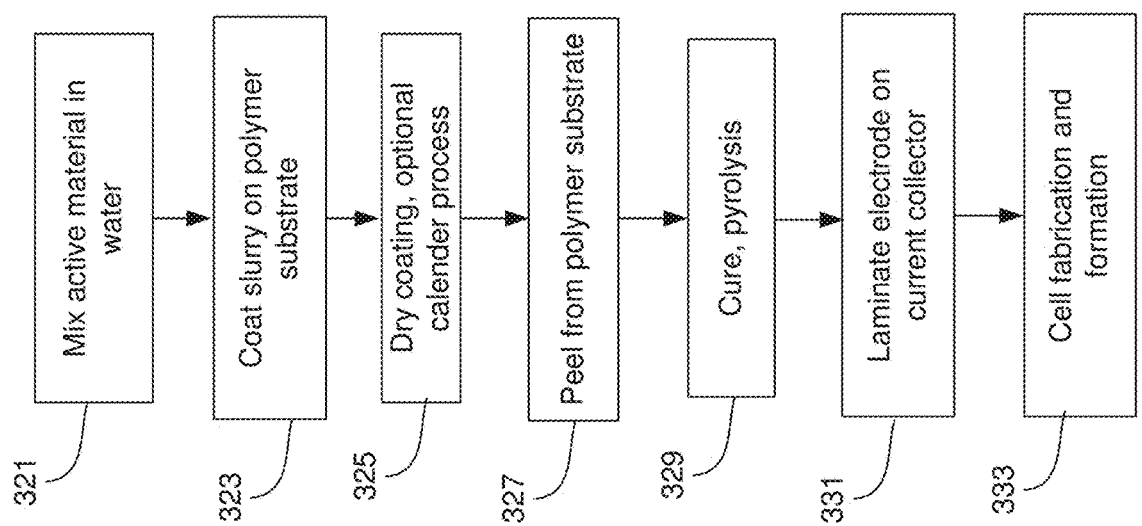
FIG. 3B is a flow diagram for of an alternative process for lamination of electrodes, in accordance with an example embodiment of the disclosure.

FIG. 3B is a flow diagram of an alternative process for lamination of electrodes, in accordance with an example embodiment of the disclosure. While the previous process to fabricate composite anodes employs a direct coating process, this process physically mixes the active material, conductive additive if desired, and binder together coupled with peeling and lamination processes.

This process is shown in the flow diagram of FIG. 3B, starting with step 321 where the raw electrode coating layer may be mixed in a slurry comprising phenolic/resol type polymer (phenolic resin) with poly(methyl vinyl ether-alt-maleic anhydride) (PMVMA) with the ratio of phenolic resin:PMVMA ranging but not limited to about 1:1, 1:0.5, and 1:0.25 by weight. The starting wt % of PMVMA may be about 10%, 20%, or <50% in deionized (DI) water. Phenolic resins and PMVMA form polymer blends readily with DI water without gelling/phase separation and creates a viscous solution that can be directly used for preparing the anode slurry.

In another example scenario, phenolic/resol type polymers (phenolic resins) may be mixed with poly(methyl vinyl ether-alt-maleic acid) (PMVMA-Acid) with the ratio of Phenolic resin:PMVMA-Acid ranging but not limited to about 1:1, 1:0.5, and 1:0.25 by weight (Table-2). The starting wt % of PMVMA-Acid may be about 10%, 20%, or <50% in deionized (DI) water.

In yet another example scenario, phenolic/resol type polymer (phenolic resins) may be mixed with poly(acrylamide-co-diallyldimethylammonium chloride) (PDADAM) with the ratio of phenolic resin:PDADAM ranging but not limited to about 1:1, 1:0.5, and 1:0.25 by weight. The starting wt % of PDADAM can be about 10%, 20%, or <50% in deionized (DI) water. In each of these scenarios, no solvents are need in mixing the slurry.

The particle size and mixing times may be varied to configure the electrode coating layer density and/or roughness. Furthermore, cathode electrode coating layers may be mixed in step 321, where the electrode coating layer may comprise lithium cobalt oxide (LCO), lithium iron phosphate, lithium nickel cobalt manganese oxide (NMC), Ni-rich lithium nickel cobalt aluminum oxide (NCA), lithium manganese oxide (LMO), lithium nickel manganese spinel, LFP, Li-rich layer cathodes, LNMO or similar materials or combinations thereof, mixed with carbon precursor and additive as described above for the anode electrode coating layer.

In step 323, the slurry may be coated on a polymer substrate, such as polyethylene terephthalate (PET), polypropylene (PP), or Mylar. The slurry may be coated on the PET/PP/Mylar film at a loading of 3-6 mg/cm$^2$ for the anode and 15-35 mg/cm$^2$ for the cathode, and then dried in step 325. An optional calendering process may be utilized where a series of hard pressure rollers may be used to finish the film/substrate into a smoothed and denser sheet of material.

In step 327, the green film may then be removed from the PET, where the active material may be peeled off the polymer substrate, the peeling process being optional for a polypropylene (PP) substrate, since PP can leave ~2% char residue upon pyrolysis. The peeling may be followed by a cure and pyrolysis step 329 where the film may be cut into sheets, and vacuum dried using a two-stage process (100-140° C. for 14-16 hours, 200-240° C. for 4-6 hours). The dry film may be thermally treated at 1000-1300° C. to convert the polymer matrix into carbon.

In step 331, the pyrolyzed material may be flat press or roll press laminated on the current collector, where for aluminum foil for the cathode and copper foil for the anode may be pre-coated with polyamide-imide with a nominal loading of 0.35-0.75 mg/cm$^2$ (applied as a 5-7 wt % varnish in NMP, dried 10-20 hour at 100-140° C. under vacuum). In flat press lamination, the active material composite film may be laminated to the coated aluminum or copper using a heated hydraulic press (30-70 seconds, 250-350° C., and 3000-5000 psi), thereby forming the finished composite electrode. In another embodiment, the pyrolyzed material may be roll-press laminated to the current collector.

In step 333, the electrodes may then be sandwiched with a separator and electrolyte to form a cell. The cell may be subjected to a formation process, comprising initial charge and discharge steps to lithiate the anode, with some residual lithium remaining, and testing to assess cell performance.

Figure 4A:
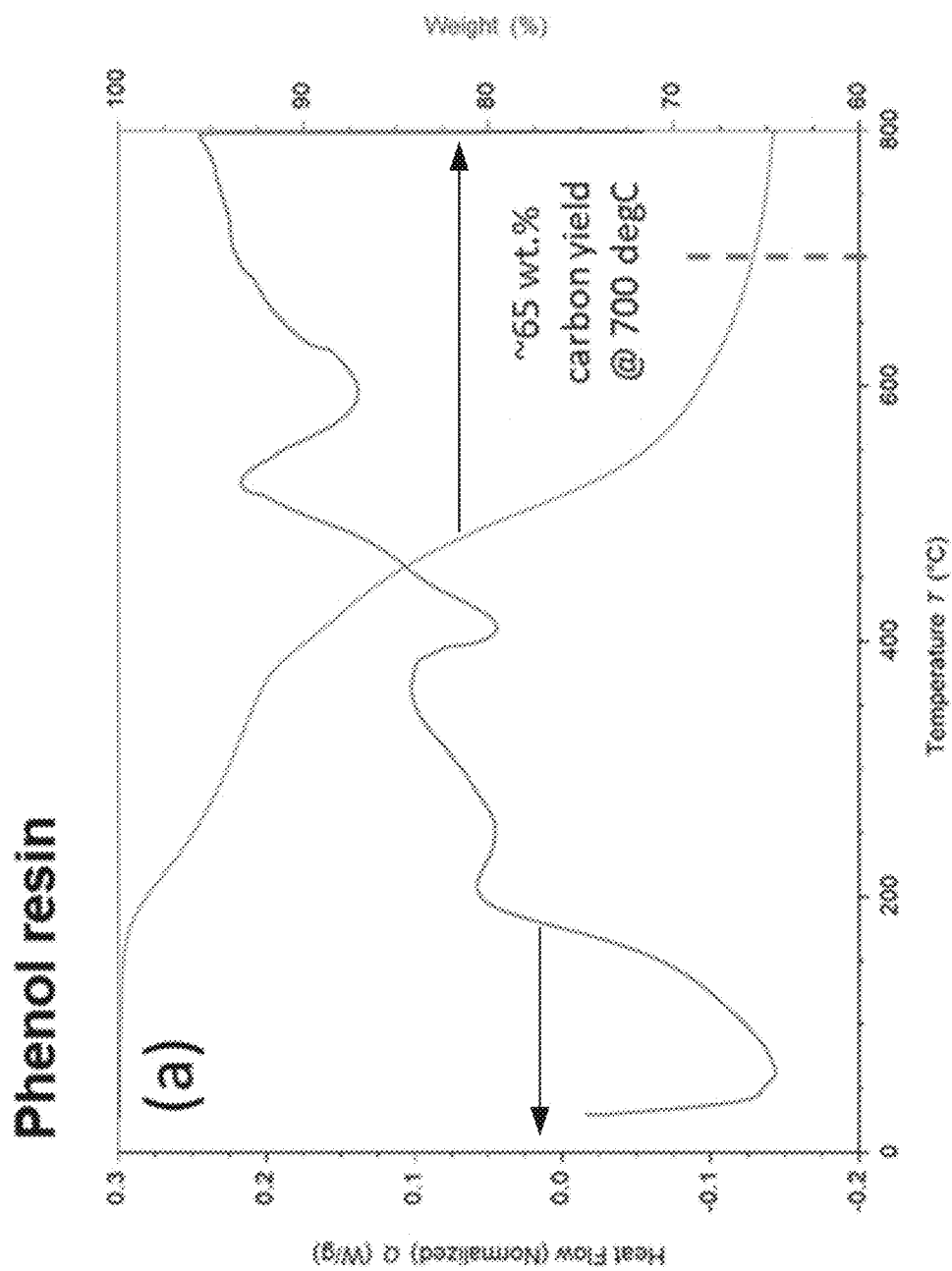
FIGS. 4A-4C illustrate thermal gravimetric analysis (TGA) of a dried phenolic resin and phenolic resins with varying amount of PMVMA, in accordance with an example embodiment of the disclosure.
Figure 4B:
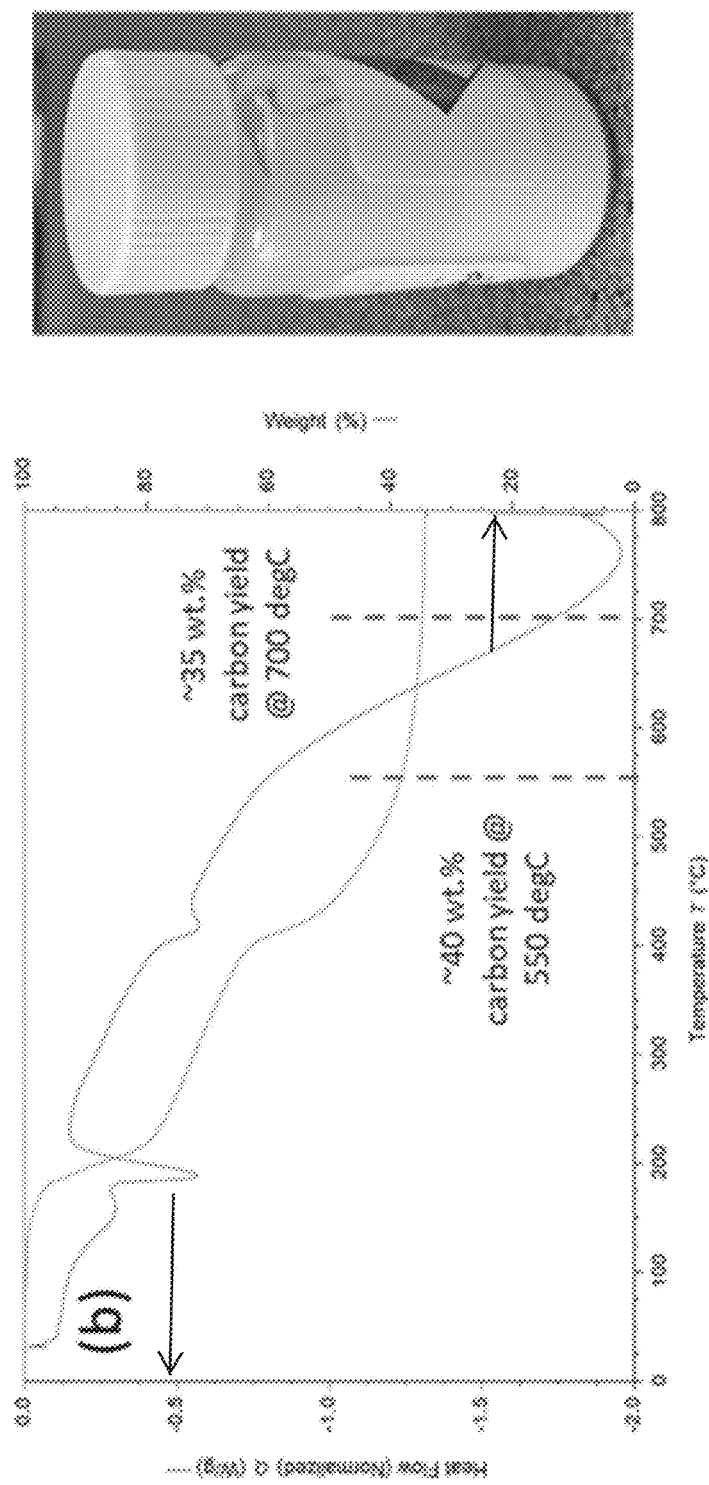
Figure 4C:
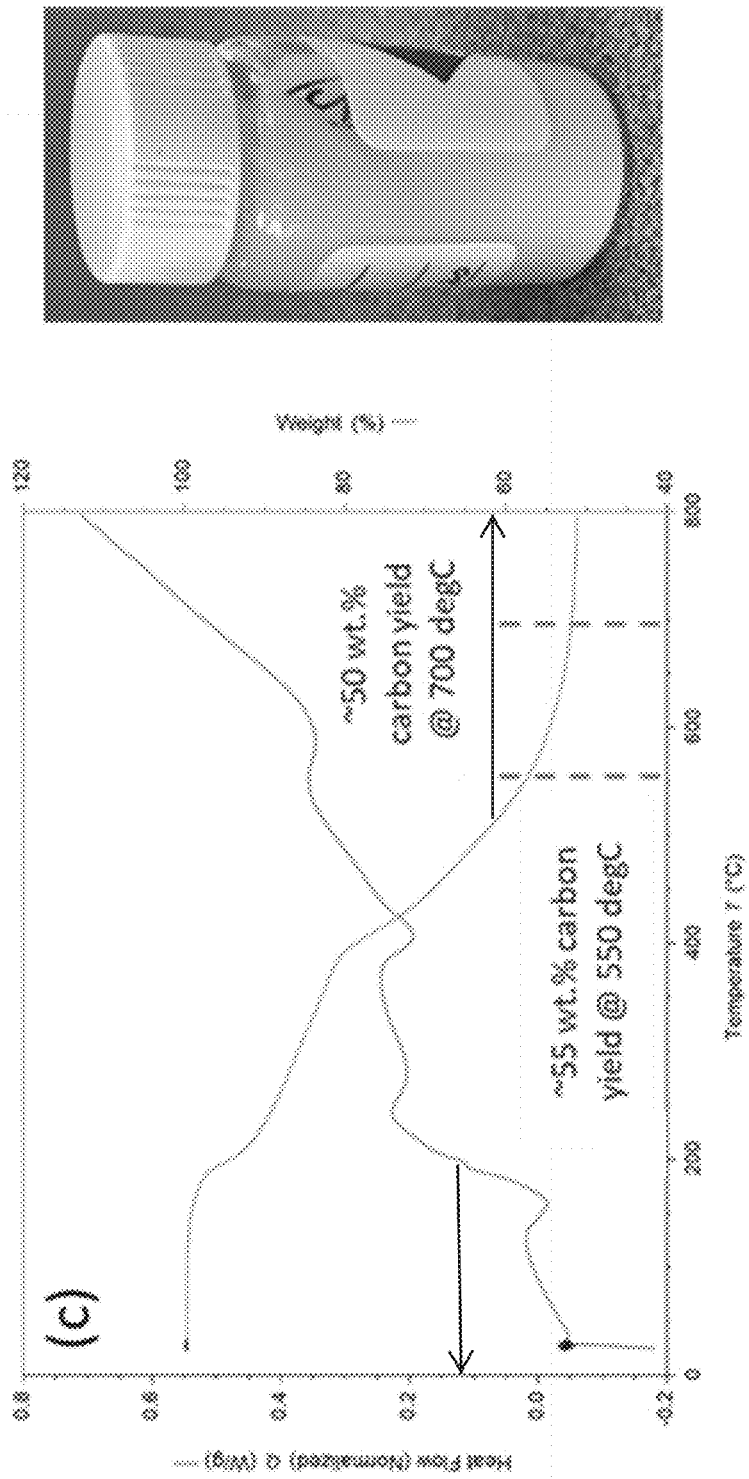

FIGS. 4A-4C illustrate thermal gravimetric analysis (TGA) of a dried unmodified phenolic/resol type polymers (phenolic resins) and Phenolic/resol type polymers (phenolic resins) which are blended with varying amounts of Poly(methyl vinyl ether-alt-maleic anhydride) (PMVMA), in accordance with an example embodiment of the disclosure. The ratio of Phenolic resin:PMVMA ranges include but are not limited to about 1:1, 1:0.5, and 1:0.25 by weight (Table-1). Starting wt % of PMVMA may be about 10%, 20%, or <50% in deionized (DI) water.

TABLE 1

| Sample-1 | | Sample-2 | | Sample-3 | |
|---|---|---|---|---|---|
| Phenolic/Resol | PMVMA | Phenolic/Resol | PMVMA | Phenolic/Resol | PMVMA |
| 1 | 1.000 | 1 | 0.500 | 1 | 0.250 |
| Phenolic resin (g) | 5.1 | Phenolic resin (g) | 5.1 | Phenolic resin (g) | 5.1 |
| PMVMA (g) | 20.1 | PMVMA (g) | 10.05 | PMVMA (g) | 5.025 |

The analysis of the dried phenolic resin+PMVMA blends may be performed under a nitrogen, argon, or any other inert atmosphere, or under forming gas atmosphere. The result of the TGA analysis indicates that the pure phenolic resin has ~65% char yield at 800° C., where the char yield may be varied by changing the composition of PMVMA+phenolic resin blend. Even with 50% of phenolic resin replaced with PMVMA, as in Sample-1 of FIG. 4B, the final polymeric blend displays 35-40% char yield after 700° C. pyrolysis under argon. Sample 3, shown in FIG. 4C, comprises a phenolic resin to PMVMA ratio of 1:0.25 with 50% wt % carbon yield at 700° C. The photo insets in FIGS. 4B and 4C show samples of as-prepared water-based phenolic resin-PMVMA binders.

Figure 5:
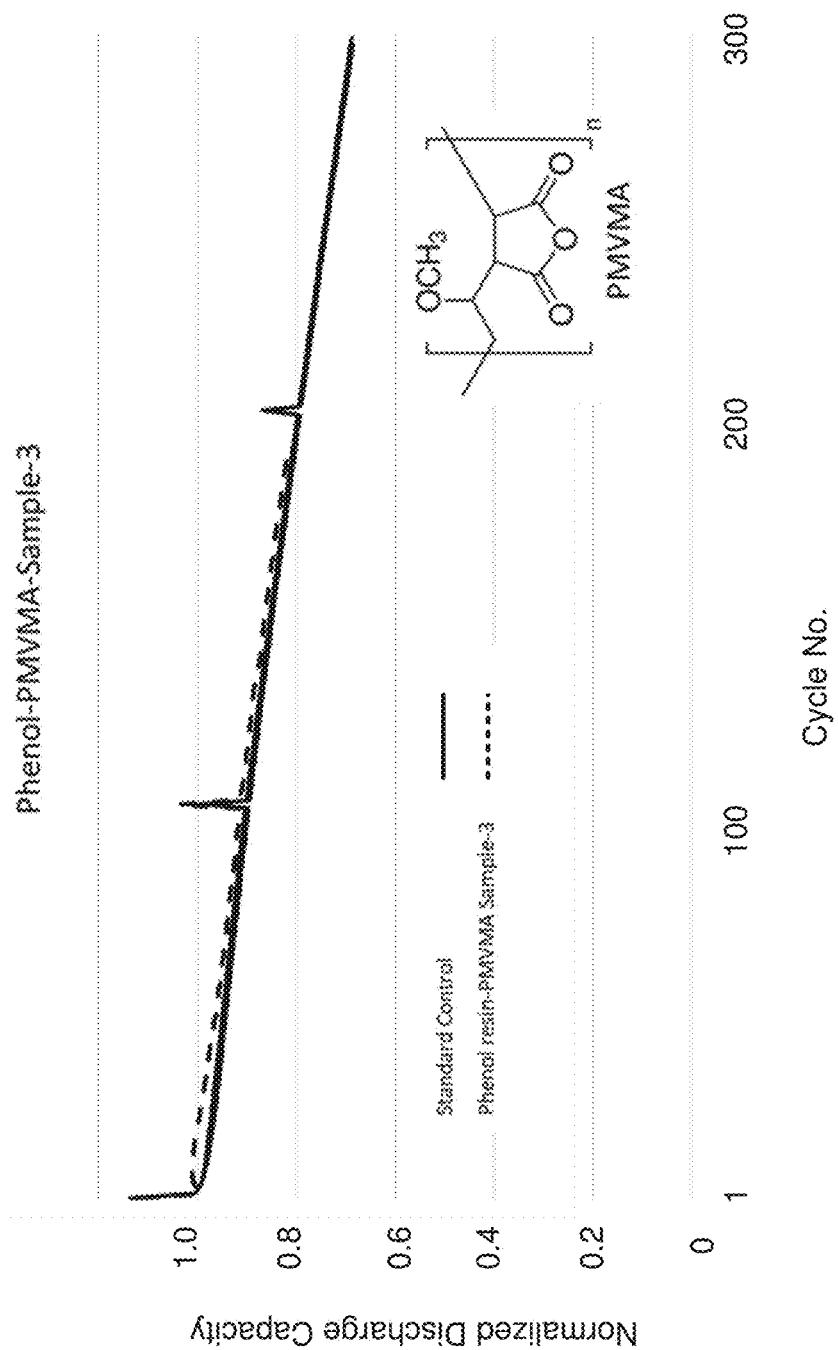
FIG. 5 is a plot comparing the normalized capacity retention of a cell with standard bonded anodes prepared using organic solvent versus a cell with anodes prepared using a phenolic resin-PMVMA polymer blend, in accordance with an example embodiment of the disclosure.

FIG. 5 is a plot comparing the normalized capacity retention of a cell with standard bonded anodes prepared using organic solvent versus a cell with anodes prepared using the Phenolic resin-PMVMA polymer blend, in accordance with an example embodiment of the disclosure. The anodes were formed from slurries formulated to obtain a final anode composition with silicon to carbon ratio of 90:10 W/W after pyrolysis. As shown in FIG. 5, the Phenolic resin-PMVMA polymer blend anode exhibits better normalized capacity retention compared to the standard anode. In this example, the standard anode is a free-standing pyrolyzed anode that is bonded on to a copper current collector using a lamination process as opposed to the direct coated Phenolic resin-PMVMA polymer blend anode.

Figure 6:
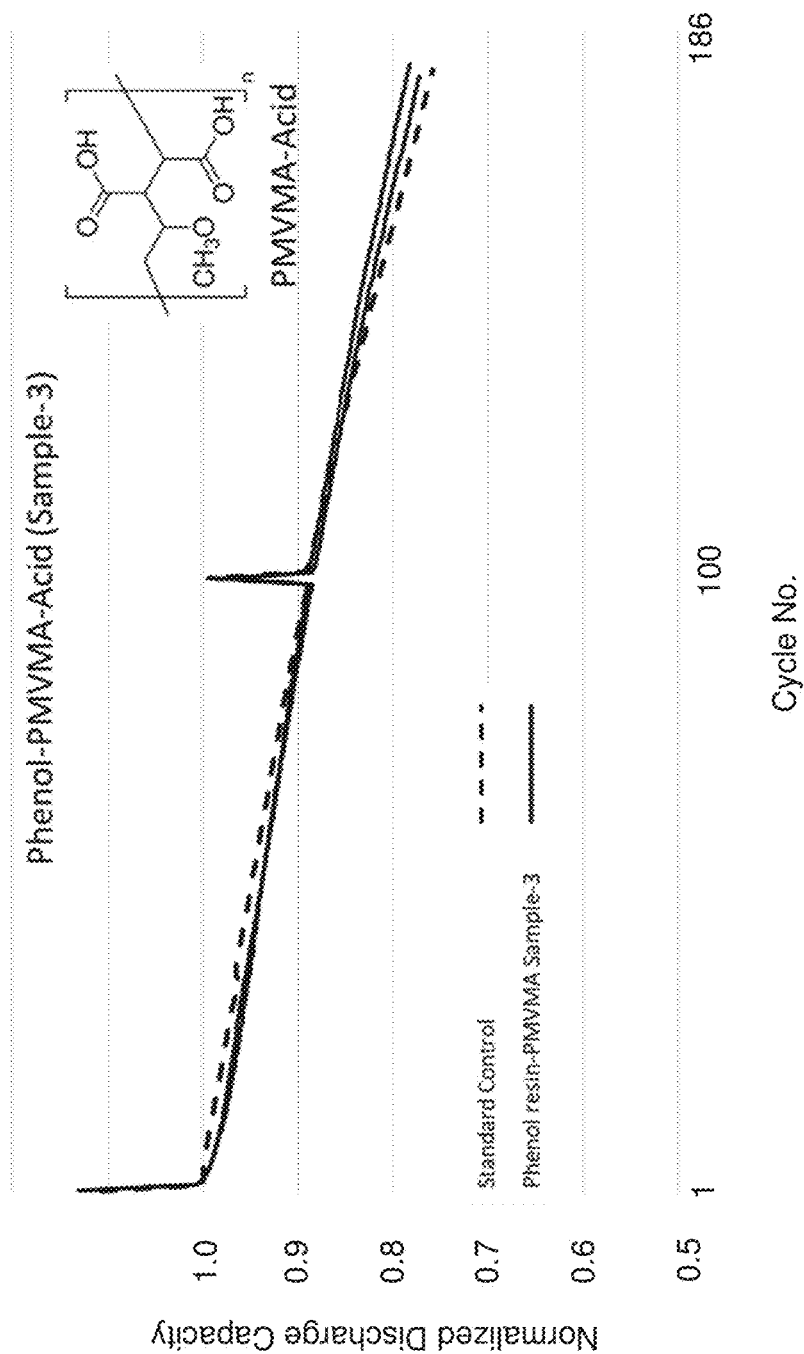
FIG. 6 is a plot comparing the normalized capacity retention of a cell with standard bonded anodes prepared using organic solvent versus a cell with anodes prepared using a phenolic resin-PMVMA-acid binder, in accordance with an example embodiment of the disclosure.

Further, phenolic/resol type polymers (phenolic resins) blended with varying amounts of Poly(methyl vinyl ether-alt-maleic acid) (PMVMA-Acid) can be made in accordance with an example embodiment of the disclosure. The Phenolic resin:PMVMA-Acid ratio ranges include but are not limited to about 1:1, 1:0.5, and 1:0.25 by weight (same as Table 1, above). Starting wt % of PMVMA-Acid can be about 10%, 20%, or <50% in deionized (DI) water. FIG. 6 is a plot comparing the normalized capacity retention of a cell with standard bonded anodes prepared using organic solvent versus a cell with anodes prepared using Phenolic resin-PMVMA-Acid binder, in accordance with an example embodiment of the disclosure. The anodes were formed from slurries formulated to obtain a final anode composition with a silicon to carbon ratio of 90:10 W/W after pyrolysis. As shown in FIG. 6, the phenolic resin-PMVMA Acid anode exhibits better normalized capacity retention compared to the standard anode, with about 80% retention at nearly 200 cycles. In this example, the standard anode is a free-standing pyrolyzed anode that is bonded on to a copper current collector using a lamination process as opposed to the direct coated Phenolic resin-PMVMA Acid anode.

Figure 7:
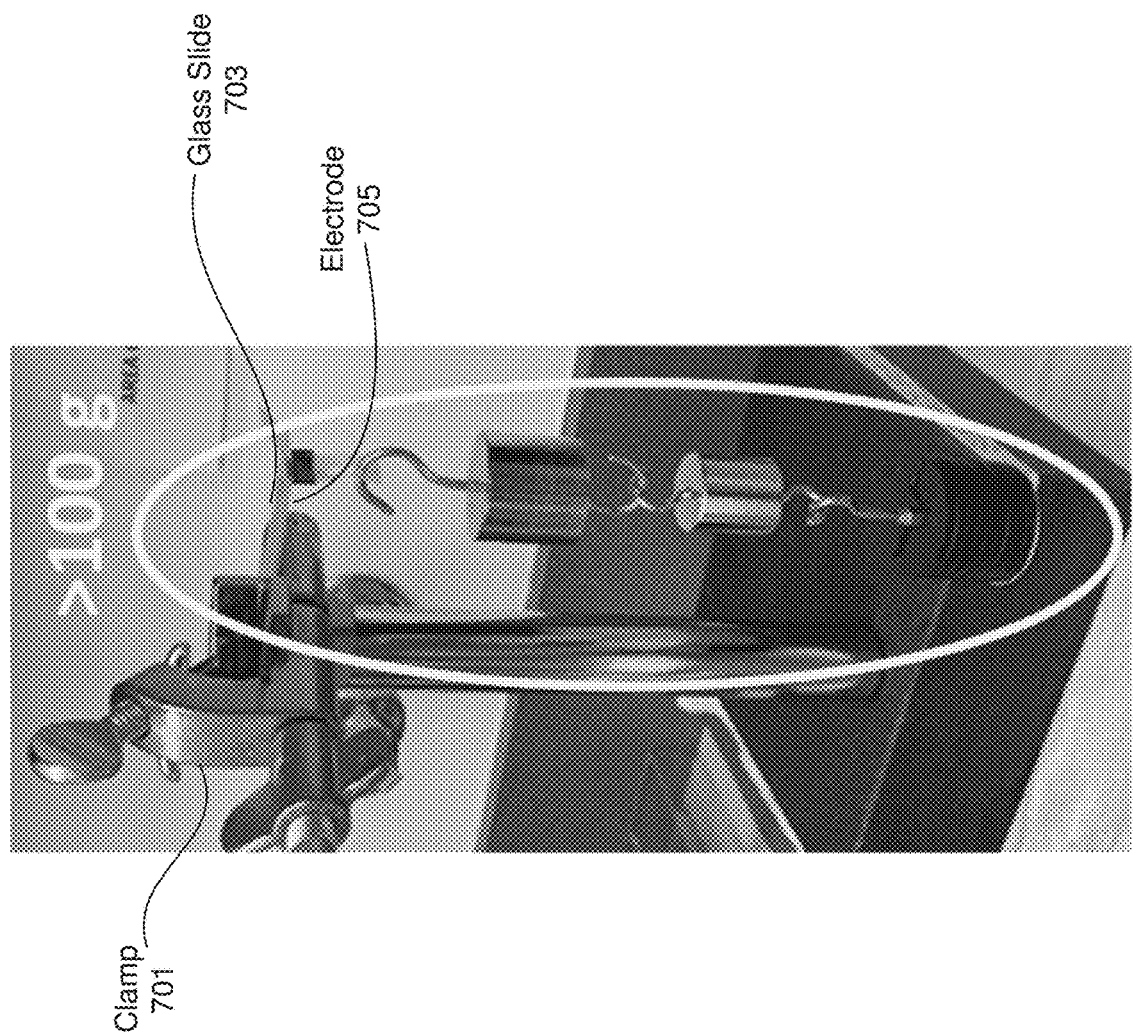
FIG. 7 is a photo illustrating an anode adhesion test, in accordance with an example embodiment of the disclosure.

FIG. 7 is a photo illustrating an anode adhesion test, in accordance with an example embodiment of the disclosure. The test setup includes a clamp 701 for holding an electrode 705 fastened to a glass slide 703 using adhesive tape (not visible) holding the anode on one side on the other is a double sided adhesive tape (not visible) for coupling to weights.

The image demonstrates the result of an adhesion test for a pyrolyzed anode prepared using a phenolic resinPMVMA-acid blend. The anode shows a superior adhesion strength, with the capability of holding greater than 100 grams of weights before the coating detaches from the copper. Such adhesion is much higher than most anodes which mostly fail to hold more than 50 grams of weights. The improved adhesion of anodes may be due to the presence of acid groups, which contribute to the retaining of the anode structure during the pyrolysis process and also due to the surface treatment effect of acidic groups on the metallic (e.g. copper) current collector.

Figure 8:
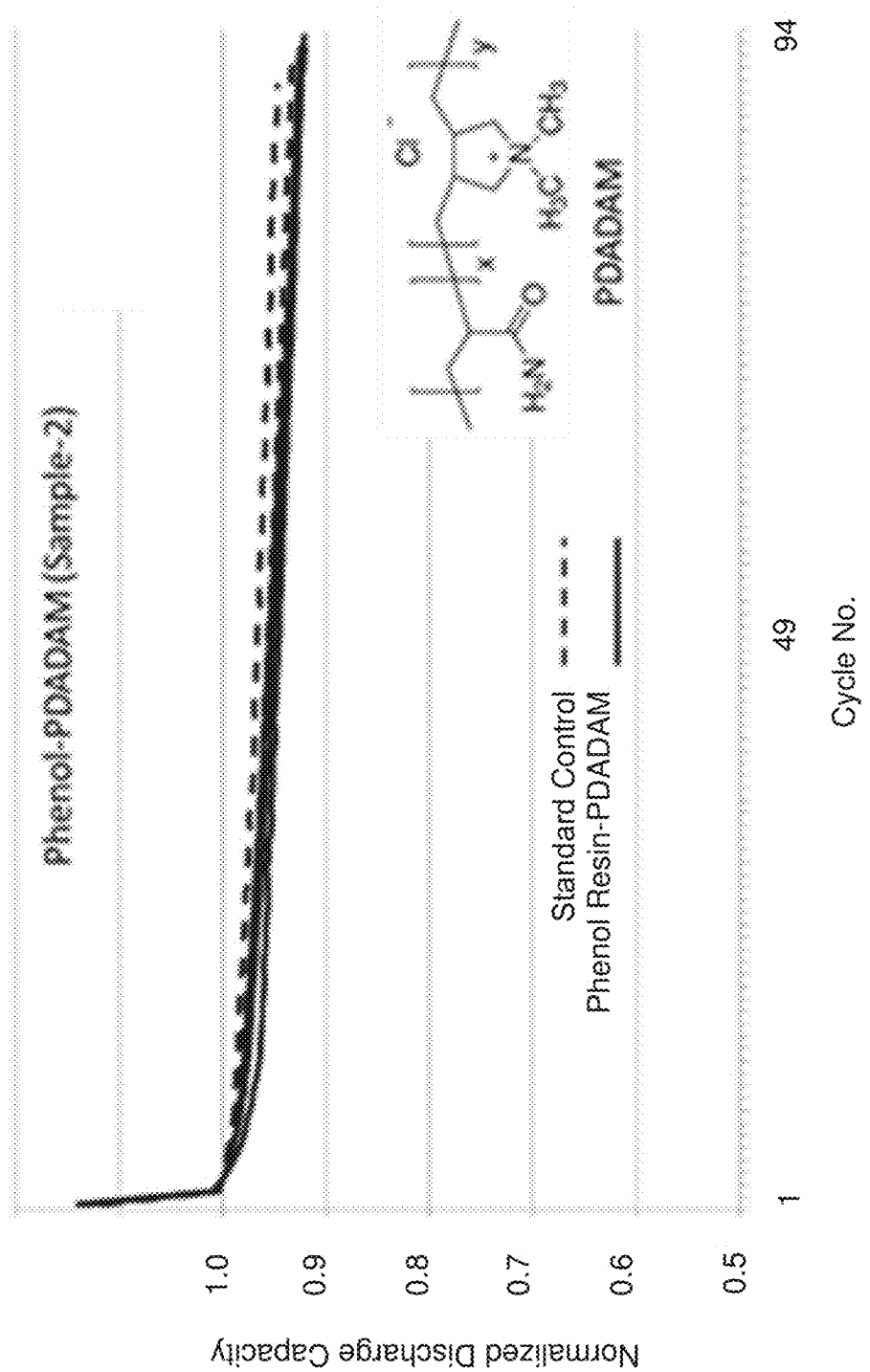
FIG. 8 is a plot comparing the normalized capacity retention of a cell with standard bonded anodes prepared using organic solvent versus a cell with anodes prepared using phenolic/resol type polymer mixed with PDADAM, in accordance with an example embodiment of the disclosure.

Poly(acrylamide-co-diallyldimethylammonium chloride) (PDADAM) may be crosslinked with a phenolic/resol type polymer to prepare a new class of water-based phenol-PDADAM polymer blend as a binder for Si anodes. In this example, amide bonding enables water-based slurry preparation and improves anode performance. In addition to the previous example of carboxylic groups, amides also may initiate crosslinking with phenolic resin in an aqueous medium. FIG. 8 is a plot comparing the normalized capacity retention of a cell with standard bonded anodes prepared using organic solvent versus a cell with anodes prepared using phenolic/resol type polymer mixed with PDADAM, in accordance with an example embodiment of the disclosure.

The slurry may be formulated to obtain a final anode composition with a silicon to carbon ratio of 90:10 W/W after pyrolysis. The plot shows the comparison of the normalized capacity retention of the standard anodes prepared using organic solvent versus anodes prepared using phenolic resin-PDADAM polymer. The phenolic resin-PDADAM anode exhibits a better-normalized capacity retention compared to the standard anode. The standard anode is a free-standing pyrolyzed anode that is bonded on to a copper current collector using an adhesive coating.

In an example scenario, formaldehyde may be present in the phenolic resin used in anode active material slurry, where the degree of the presence of formaldehyde in the phenolic resin may range from 1:0.5 to 1:2 (phenol to formaldehyde) during synthesis. The synthesis of phenolic binders may be tailored to optimize the water tolerance (solubility/dispersibility), solid content, and viscosity of the phenolic resin. The water tolerance of phenolic resin can be 10-80% w.r.t. phenolic resin content before a phase separation in water occurs. Phenolic resin may contain 1-10 wt %, 10-25 wt %, or 25-90 wt %. The amount of binder resin required to achieve the desired carbon wt % after pyrolysis is significantly lowered as the initial solid content and char yield of the phenolic resin-polymer conjugated resin is higher than the common water soluble polymer binders. The water solubility and viscosity of the phenolic resin may be configured to achieve desired slurry viscosity via crosslinking with one or more water soluble polymers. In one embodiment, the water tolerance of a phenolic/resol type polymer can be optimized during synthesis of the polymer, as described above.

In another example scenario, water-based phenolic resins may be created by modification of a phenolic resin with another polymer, such as by crosslinking. Phenolic resins crosslinked with poly(methyl vinyl ether-alt-maleic anhydride); poly(methyl vinyl ether-alt-maleic acid) and other derivatives of methyl vinyl ether-alt-maleic with different molecular weights and degree of polymerization may be used to form silicon-dominant anodes without solvents. These polymer blends may be used with different molecular weights with functional aliphatic and aromatic amine compounds as binders for silicon-dominant anodes. In addition, any of the above-mentioned polymer components may be used with phenolic or resol type polymers for all different types of Si or $SiO_x$ anodes.

In yet another example scenario, unmodified phenolic resins may be utilized without the aforementioned crosslinking polymers, their derivatives, and their combinations for all different types of Si or $SiO_x$ anodes. Furthermore, the crosslinked polymers, their derivatives, and their combinations may be used without pyrolysis for electrode preparation. The above phenolic resins also can be expanded to use with coated type Si/SiOx. Coating materials can be raging from conductive carbon to ceramic coating. The final slurry prepared using the above may contain secondary electroactive/inactive components that may support the performance of the anode.

Conductive additives, such as Super P, carbon black, graphite, graphene, carbon nano/micro fibers, carbon nanotubes, porous (meso/macro) carbons and other types of one-, two-, three-dimensional carbon materials can be introduced into all different aforementioned crosslinking polymers, their derivatives, and their combinations. Similarly, metallic nano/micro particle, fibers, wires and other types of one-, two-, three-dimensional structures may be introduced into all different aforementioned crosslinked polymers, their derivatives, and their combinations. Finally, water soluble polyimides such as polyamide-imide and polyimide analogs (<50%) may be used in combination with phenolic resin to form silicon dominant anodes with improved performance. These analogues can have different molecular weights and degree of polymerization.

Water based crosslinked phenolic resins with high char yield upon pyrolysis at temperatures>200 degC may be utilized as electrode binder. These polymer blends can undergo curing before pyrolysis to form a re-arranged polymeric network. The preparation of polymers may comprise many decomposable functional groups such as —OH, NH—, $NH_2$, —COOH at a relatively low temperature, below the decomposition temperature of phenols. These groups can generate gaseous byproducts that can create nano to micro pores within the anode/carbon media. The presence of these pores may facilitate the rapid volume changes of silicon microparticles during cycling as well as electrolyte soaking to improve ionic conductivity of the anodes.

Phenolic resins with poly(methyl vinyl ether-alt-maleic acid), which contains carboxylic acid groups, may be utilized in silicon-dominant anode fabrication. These carboxylicacid group materials may significantly improve the adhesion of anode materials on the current collector, such as a copper foil surface. The presence of carboxylic acid groups may participate in surface treatment/roughening of the copper, or other metal, current collector. Additionally, these functional groups may further improve the particle to particle interactions required to retain the electrode structure during pyrolysis.

The presence of functional groups such as —COOH and —$NH_2$ may promote the crosslinking with the functional groups in phenolic polymer resin (various —OH and —O—). In addition, in-situ crosslinking via thermal and/or photochemical crosslinking of phenol or phenolic type polymer resins in the presence of a second water-soluble polymer may occur with these materials. The crosslinking reaction may be initiated in the presence of an inorganic salt or catalyst or photochemically.

Strong hydrogen bonds associated with —COOH groups may improve the particle-particle affinity. The existence of strong chemical bonds in the slurry form is utilized to create a carbon matrix that strongly adheres to the particles. New bonds may be formed between particles and the copper surface as a result of decomposition of these functional groups upon pyrolysis.

These materials and combinations may provide advantages such as being environmentally friendly, increased cycle life, reduced cost, faster processing, improved anode adhesion, and improved manufacturability.

In an example embodiment of the disclosure, a method and system are described for water based phenolic binders for silicon-dominant anodes. The battery electrode may comprise an electrode coating layer on a current collector, where the electrode coating layer is formed from silicon and a pyrolyzed water-based phenolic binder. The water-based phenolic binder may comprise poly(methyl vinyl ether-alt-maleic anhydride), poly(methyl vinyl ether-alt-maleic acid), and/or methyl vinyl ether-alt-maleic. The water-based phenolic may be crosslinked with a phenolic resin. The electrode coating layer may comprise conductive additives. The current collector may comprise one or more of a copper, tungsten, stainless steel, and nickel foil in electrical contact with the electrode coating layer. The electrode coating layer may comprise more than 70% silicon. The electrode may be in electrical and physical contact with an electrolyte, where the electrolyte includes a liquid, solid, or gel. The battery electrode may be in a lithium ion battery. These binder systems can use with other type of electrochemical storage devices, not limited to Li—S(lithium sulfur), Na-ion (sodium ion), Li-air (lithium-air).

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method of forming an electrode, the method comprising:
   creating an electrode coating layer from an electrode slurry comprising an aqueous solution of a water-based phenolic binder and Si powder, with optional additives;
   fabricating a battery electrode by coating the slurry on a current collector; and
   pyrolyzing said electrode coating layer;
   wherein the water-based phenolic binder comprises a phenolic/resol type polymer crosslinked with poly(methyl vinyl ether-alt-maleic anhydride).

2. The method according to claim 1, wherein the electrode coating layer further comprises conductive additives.

3. The method according to claim 1, wherein the current collector comprises one or more of a copper, tungsten, stainless steel, and nickel foil in electrical contact with the electrode coating layer.

4. The method according to claim 1, wherein the electrode coating layer comprises more than 70% silicon.

5. The method according to claim 1, wherein the electrode is in electrical and physical contact with an electrolyte, the electrolyte comprising a liquid, solid, or gel.

6. A method of forming an electrode, the method comprising:
   creating an electrode coating layer from an electrode slurry comprising an aqueous solution of a water-based phenolic binder and Si powder, with optional additives;
   fabricating a battery electrode by coating the slurry on a current collector; and
   pyrolyzing said electrode coating layer;
   wherein the water-based phenolic binder comprises a phenolic/resol type polymer crosslinked with poly(methyl vinyl ether-alt-maleic acid).

7. The method according to claim 6, wherein the electrode coating layer further comprises conductive additives.

8. The method according to claim 6, wherein the current collector comprises one or more of a copper, tungsten, stainless steel, and nickel foil in electrical contact with the electrode coating layer.

9. The method according to claim 6, wherein the electrode coating layer comprises more than 70% silicon.

10. The method according to claim 6, wherein the electrode is in electrical and physical contact with an electrolyte, the electrolyte comprising a liquid, solid, or gel.

11. A method of forming an electrode, the method comprising:
    creating an electrode coating layer from an electrode slurry comprising an aqueous solution of a water-based phenolic binder and Si powder, with optional additives;
    fabricating a battery electrode by coating the slurry on a current collector; and
    pyrolyzing said electrode coating layer;
    wherein the water-based phenolic binder comprises a phenolic/resol type polymer crosslinked with poly (acrylamide-co-diallyldimethylammonium chloride) (PDADAM).

12. The method according to claim 11, wherein the electrode coating layer further comprises conductive additives.

13. The method according to claim 11, wherein the current collector comprises one or more of a copper, tungsten, stainless steel, and nickel foil in electrical contact with the electrode coating layer.

14. The method according to claim 11, wherein the electrode coating layer comprises more than 70% silicon.

15. The method according to claim 11, wherein the electrode is in electrical and physical contact with an electrolyte, the electrolyte comprising a liquid, solid, or gel.

16. A method of forming an electrode, the method comprising:
    creating an electrode coating layer from an electrode slurry comprising an aqueous solution of a water-based phenolic binder and Si powder, with optional additives;
    fabricating a battery electrode by coating the slurry on a current collector; and
    pyrolyzing said electrode coating layer;
    wherein the water-based phenolic binder comprises a phenol-crotonaldehyde-resorcinol derivative.

17. The method according to claim 16, wherein the electrode coating layer further comprises conductive additives.

18. The method according to claim 16, wherein the current collector comprises one or more of a copper, tungsten, stainless steel, and nickel foil in electrical contact with the electrode coating layer.

19. The method according to claim 16, wherein the electrode coating layer comprises more than 70% silicon.

20. The method according to claim 16, wherein the electrode is in electrical and physical contact with an electrolyte, the electrolyte comprising a liquid, solid, or gel.

21. A method of forming an electrode, the method comprising:
    creating an electrode coating layer from an electrode slurry comprising an aqueous solution of a water-based phenolic binder and Si powder, with optional additives;
    fabricating a battery electrode by coating the slurry on a current collector; and
    pyrolyzing said electrode coating layer;
    wherein the water-based phenolic binder comprises a phenolic/resol type polymer derivatized by one or more functional groups selected from the group consisting of ethers, polyethoxylates, esters, glycolipids, phosphates, oxiranes, and/or carbamates.

22. The method according to claim 21, wherein the electrode coating layer further comprises conductive additives.

23. The method according to claim 21, wherein the current collector comprises one or more of a copper, tungsten, stainless steel, and nickel foil in electrical contact with the electrode coating layer.

24. The method according to claim 21, wherein the electrode coating layer comprises more than 70% silicon.

25. The method according to claim 21, wherein the electrode is in electrical and physical contact with an electrolyte, the electrolyte comprising a liquid, solid, or gel.

* * * * *